US012713481B2

(12) United States Patent
Lu et al.

(10) Patent No.: US 12,713,481 B2
(45) Date of Patent: Aug. 18, 2026

(54) RELAY DEVICE SELECTION FOR SIDELINK COMMUNICATION OF WIRELESS DEVICES

(71) Applicant: T-MOBILE INNOVATIONS LLC, Overland Park, KS (US)

(72) Inventors: Kun Lu, Bellevue, WA (US); John J. Humbert, IV, Roeland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 260 days.

(21) Appl. No.: 18/472,821

(22) Filed: Sep. 22, 2023

(65) Prior Publication Data

US 2025/0106915 A1 Mar. 27, 2025

(51) Int. Cl.

*H04W 76/14* (2018.01)
*H04B 7/155* (2006.01)
*H04W 40/22* (2009.01)
*H04W 88/04* (2009.01)

(52) U.S. Cl.

CPC ........ *H04W 76/14* (2018.02); *H04B 7/15507* (2013.01); *H04W 40/22* (2013.01); *H04W 88/04* (2013.01)

(58) Field of Classification Search

CPC ..... H04W 76/14; H04W 40/22; H04W 88/04; H04B 7/15507

See application file for complete search history.

(56) References Cited

U.S. PATENT DOCUMENTS

2020/0008127 A1* 1/2020 Ohtsuji .................. H04W 4/70
2021/0258988 A1* 8/2021 Balakrishnan ....... G06N 3/0442
2022/0346163 A1* 10/2022 Damnjanovic ....... H04W 76/15
2023/0142957 A1* 5/2023 Paladugu .......... H04W 28/0226 370/329
2023/0239714 A1 7/2023 Fujishiro et al.
(Continued)

FOREIGN PATENT DOCUMENTS

DE 102021113144 A1 * 11/2021 .......... H04W 36/033
EP 3962131 A1 * 3/2022 ............ H04W 88/04
(Continued)

OTHER PUBLICATIONS

Kuusilinna, et al.; "Describing MIMO Designs for Rapid Prototyping in the Bee Environment"; 2004 12th European Signal Processing Conference; Sep. 6, 2004; pp. 693-696; IEEE.
(Continued)

*Primary Examiner* — Angela Widhalm De Rodriguez

(57) ABSTRACT

Technology is disclosed herein for selecting a relay wireless device for sidelink communication with a remote wireless device. In an implementation, a wireless communication device determines to establish a sidelink connection to a wireless communication network. The wireless device discovers one or more relay devices in connection with the wireless network. The wireless device selects a relay device from among the one or more relay devices based on one or more selection factors including throughput. The wireless device connects to the wireless network via the sidelink connection to the relay device. In an implementation, the wireless device determines to establish the sidelink connection based on being outside the coverage area of the wireless communication network.

20 Claims, 7 Drawing Sheets

(56) References Cited

U.S. PATENT DOCUMENTS

| | | | |
|---|---|---|---|
| 2023/0239882 | A1 | 7/2023 | Damnjanovic et al. |
| 2023/0413089 | A1* | 12/2023 | Wang .................... H04W 24/10 |
| 2024/0259906 | A1* | 8/2024 | Freda .................. H04W 36/302 |

FOREIGN PATENT DOCUMENTS

| | | | |
|---|---|---|---|
| WO | 2011058751 | A1 | 5/2011 |
| WO | 2023161431 | A1 | 8/2023 |

OTHER PUBLICATIONS

Barri, et al.; "A Mechanism for Improving the Spectral Efficiency in mu-MIMO for 5G and Beyond Networks"; Proceedings of the 19th ACM International Symposium on Mobility Management and Wireless Access; Nov. 22, 2021; pp. 11-16; ACMPUB27; New York, NY, USA.

* cited by examiner

DETERMINE TO ESTABLISH A SIDELINK CONNECTION TO A WIRELESS NETWORK
201
DISCOVER ONE OR MORE RELAY DEVICES IN COMMUNICATION WITH THE WIRELESS NETWORK
203
SELECT A RELAY DEVICE TO ESTABLISH SIDELINK CONNECTION BASED ON ONE OR MORE SELECTION FACTORS
205
CONNECT TO WIRELESS NETWORK VIA SIDELINK CONNECTION TO RELAY DEVICE
207

200

300

REMOTE UE 310

RELAY UE 341

RELAY UE 343

RELAY UE 345

AN 331

WIRELESS NETWORK 320

Discovers relay UEs

Capture values for selection factors from relay UEs

Select relay UE

Connect to wireless network via sidelink connection to relay UE

*Sidelink*

*UU interface connection*

RELAY DEVICE SELECTION FOR SIDELINK COMMUNICATION OF WIRELESS DEVICES

TECHNICAL FIELD

Aspects of the disclosure are related to the field of device-to-device communication of wireless devices.

BACKGROUND

Sidelink communication is a wireless networking technology that enables direct device-to-device connectivity without the need for a central base station. In sidelink communication, devices in close proximity can establish peer-to-peer links to exchange information. As such, sidelink communication between devices can be particularly useful in scenarios where traditional network infrastructure may be limited or impractical, such as in remote or underserved areas where deploying traditional network infrastructure can be challenging or costly, by facilitating expanded coverage of the wireless network on a peer-to-peer basis.

With the rapidly increasing number of Internet-connected devices (e.g., IoT devices) and the growth of vehicle-to-everything communication, sidelink connections play an important role in enhancing network efficiency, reducing latency, as well as expanding coverage. In densely packed urban environments, for example, sidelink connectivity can reduce latency and improve reliability of network communication by distributing the traffic load and reducing the need to route data traffic through a central base station. However, as sidelink communication becomes ubiquitous, optimizing network operations faces challenges on a number of fronts, including resource management, mobility management, security and authentication, interoperability, routing and relaying strategies, and as well as other aspects relating to network performance.

OVERVIEW

Technology is disclosed herein for selecting a relay wireless device for sidelink communication with a remote wireless device. In an implementation, a wireless communication device determines to establish a sidelink connection to a wireless communication network. The wireless device discovers one or more relay devices in connection with the wireless network. The wireless device selects a relay device from among the one or more relay devices based on one or more selection factors including throughput. The wireless device connects to the wireless network via the sidelink connection to the relay device.

In an implementation, the wireless device determines to establish the sidelink connection based on being outside the coverage area of the wireless communication network. In an implementation, the selection factors include a signal strength of the relay device at the Uu interface with an access point of the wireless network and a signal strength of the relay device at the PC5 interface with the wireless device.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
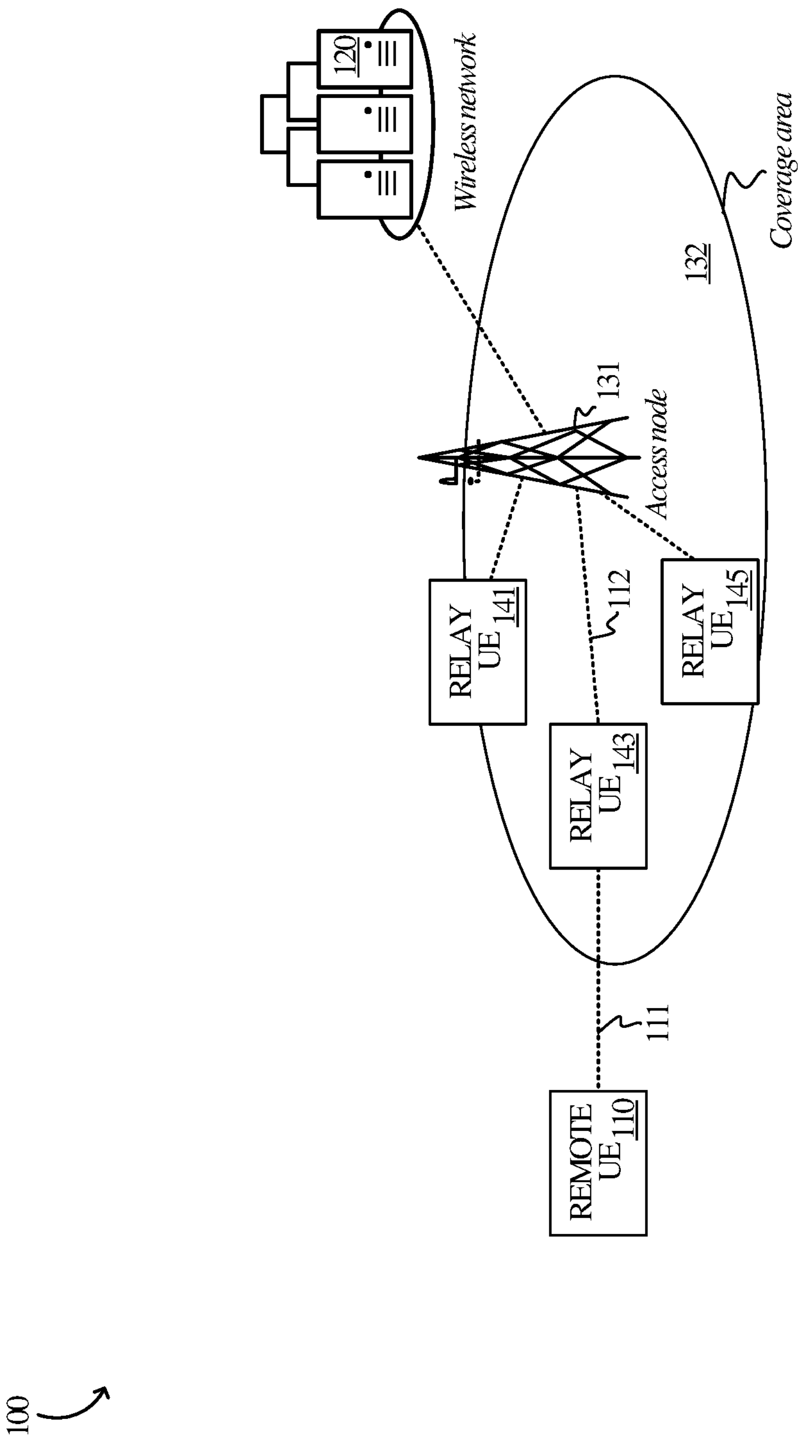
FIG. 1 illustrates an operational environment for selecting a relay UE for sidelink communication in an implementation.

Various implementations are disclosed herein by which a wireless communication device selects a relay device for sidelink communication to a wireless network. In an implementation, a wireless communication device, such as a smartphone, detects that it is outside the coverage range of a wireless communication network or, more specifically, outside the coverage range of an access node of the network. The wireless device surveys other devices in the area and discovers one or more relay devices by which a sidelink connection to the network may be established. The wireless device evaluates the relay devices according to selection factors including the throughput or capacity of each device and selects a relay device by which to link to the network. The wireless device then establishes a sidelink connection to the network hosted by the selected relay device.

For a practical illustration of the technology, a user's smartphone in a location with poor signal quality may discover multiple relay devices available for sidelink connectivity. The relay devices may be another user's smartphone, a connected vehicle, an enterprise network access point, a repeater antenna, and the like. The user's smartphone may assess the connection of each of the available relay devices to an access point and the connection between the smartphone and the available relay based on multiple factors such as throughput, frequency band, and bandwidth, then select a relay device for the sidelink connection. To select a relay device, the smartphone may execute a selection engine or algorithm which receives input for each of the candidate relay devices according to the selection factors, then computes a score for each device by which the devices can be compared for selection.

In selecting a device to act as a relay to the network, the remote device may generate a set of input factors for each candidate device which are then submitted to a selection engine. The selection engine then weights the factors for each device to generate a composite score and selects a relay device for optimally establishing the sidelink connection based on a comparison of the scores. For example, after detecting relay devices in its proximity, the remote device may identify a set of relay devices with an interface signal strength (e.g., the Uu interface signal level) within a range of acceptable values as a threshold requirement. The remote device may then collect a set of metrics for each relay device meeting the threshold requirement, including the throughput of the device, signal strength of the relay device, bandwidth, frequency band, and other connection variables. In some scenarios, the selection factors include historical connection data associated with the relay device, location information, historical connection metrics such as bandwidth, signal-to-noise ratio (SNR), signal power and quality, reliability, output power, and the like.

In an implementation, the selection engine is an artificial neural network trained to select an optimal relay device based on evaluating candidate relay devices according to selection factors. To select an optimal relay device, for each of the candidate relay devices, the selection engine configure a feature vector of the various selection metrics and generates a score for each relay device. The selection engine then selects a relay device based on the device scores. While the remote device is in communication with the network via a sidelink hosted by the selected relay device, the wireless device may continue to evaluate other relay devices in the area. For example, if the current relay device loses signal strength, the wireless device may select another relay device based on the selection factors and switch to a sidelink connection hosted by the other device.

Sidelink communication provides a way to extend coverage by supporting device-to-device communication, whereby one device in communication with a wireless network can relay network communication to a second device which lacks its own, direct communication to the network. Sidelink communication includes communication via a PC5 interface which supports short-range device-to-device communication. For example, the PC5 interface allows vehicles to communicate directly with other vehicles, infrastructure, networks, or other cellular devices, commonly referred to as "vehicle-to-everything" (V2X). The PC5 interface may be implemented on LTE, 5G, or other generations of wireless communication technology.

When a remote device determines that it is to establish a sidelink connection to a wireless network, the remote device evaluates candidate relay devices according to a number of selection factors including the signal strength at the candidate device across the Uu interface to the network access point and across a PC5 interface between the candidate device and the remote device. The signal strength of the candidate device across the Uu interface with a network access point must be within a range of values-neither too low nor too high according to predetermined threshold values. Should the Uu interface signal strength fall outside the range of acceptable values, the candidate device is removed from consideration as a relay device. To evaluate the signal strength between the remote device and candidate device, the remote device may use the SL-RSRP (Sidelink Reference Signal Received Power) measurement associated with a discovery message from the candidate device. If the SL-RSRP values falls below a threshold value, then the candidate device is removed from consideration as a relay device.

When a remote device establishes that there are multiple candidate devices available to establish a sidelink connection, the remote device will select a candidate device according to an evaluation of selection factors. The selection factors include signal metrics such as bandwidth, throughput or capacity, signal to noise ratio (SNR), and the like. Selection factors may also include, for a given candidate device, historical connection data, device output power, projected battery consumption for a connection to the device, and the like.

In some scenarios, a sidelink connection may be established although the wireless device is within the coverage area of the wireless network, i.e., within the coverage area of an access node of the network. Thus, another selection factor may be whether a direct connection by the remote device to the access point is available and connection metrics (e.g., signal strength, SNR) associated with the direct connection. For example, a remote device may be better served by a comparatively stronger or more stable relayed connection than by a weak direct connection to the network.

In various implementations, as the remote device communicates with the wireless network via a sidelink connection to a selected relay device, the remote device may continually re-evaluate the pool of devices that are available for a sidelink connection in the event that the established sidelink connection degrades and/or a better (e.g., more powerful) sidelink connection becomes available from another device.

Technical effects of the technology disclosed herein disclose an improvement to the technology for expanding network coverage via device-to-device communication. In particular, the technology optimizes the choice of relay UE to improve the quality and reliability of the sidelink connection as well as to bolster the probability of a successful sidelink and, therefore, a successful network connection. In doing so, the process improves the outcome of the sidelink connections while continuing to abide by the 3GPP ($3^{rd}$ Generation Partnership Project) standards for sidelink connections. In addition, by continuously reevaluating and reselecting a relay device for a sidelink connection, various network metrics or key performance indicators (KPIs) associated with the session are improved.

Turning now to FIG. 1, FIG. 1 illustrates operational environment 100 for selecting, by a remote device, a relay device for a sidelink connection in an implementation. Operational environment 100 includes remote user equipment (UE) 110, multiple relay UEs 141, 143, and 145, radio access node (RAN) 131, and wireless network 120. Coverage area 132 illustrates a geographic area of coverage of RAN 131 within which a wireless communication device can send and receive data transmissions with RAN 131 for wireless communication with wireless network 120. Remote UE 110 communicates with relay UE 143 via sidelink connection 111; relay UE 143 communicates with RAN 131 via direct connection 112. Although remote UE 110 is illustrated in operational environment 100 as outside of coverage area 132, in some implementations, remote UE 110 may be within coverage area 132.

Remote UE 110 and relay UEs 141, 143, and 145 are representative of devices, such as smartphones, computers, sensors, controllers, and/or some other user apparatus, with processing circuitry for wireless communication. For example, remote UE 110 and relay UEs 141, 143, and 145 can include Internet of Things (IoT) devices, wearable devices, smart vehicles, robots, sensors, augmented reality (AR) or virtual reality (VR) devices, and the like. Remote UE 110 and relay UEs 141, 143, and 145 exchange wireless communication signals with access nodes, such as RAN 131, over radio frequency bands.

RAN 131 is representative of equipment using radio frequencies to provide wireless connectivity to devices, such as Fifth Generation (5G) RANs, long-term evolution (LTE) RANS, gNodeBs, eNodeBs, NB-IoT access nodes, LP-WAN base stations, wireless relays, Wifi access nodes, Wifi hotspots, ENET access nodes, Bluetooth access nodes, and/or other wireless or wireline network transceivers. Although illustrated as a tower, RAN 131 may also include other types of access nodes, such as a WLAN access node, and communication with wireless network 120 may be relayed through a Non-3GPP Inter-Working Function (N3IWF) network function (not shown) of the respective network.

Remote UE 110, relay UEs 141, 143, 145, and RAN 131 are representative of wireless communication devices or radios which wirelessly communicate using protocols such as Fifth Generation New Radio (5GNR), 5G Advanced, 6G, LTE, Institute of Electrical and Electronic Engineers (IEEE) 802.11 (Wifi), Low-Power Wide Area Network (LP-WAN), Near-Field Communications (NFC), Code Division Multiple Access (CDMA), Frequency Division Multiple Access (FDMA), and Time Division Multiple Access (TDMA).

Figure 5:
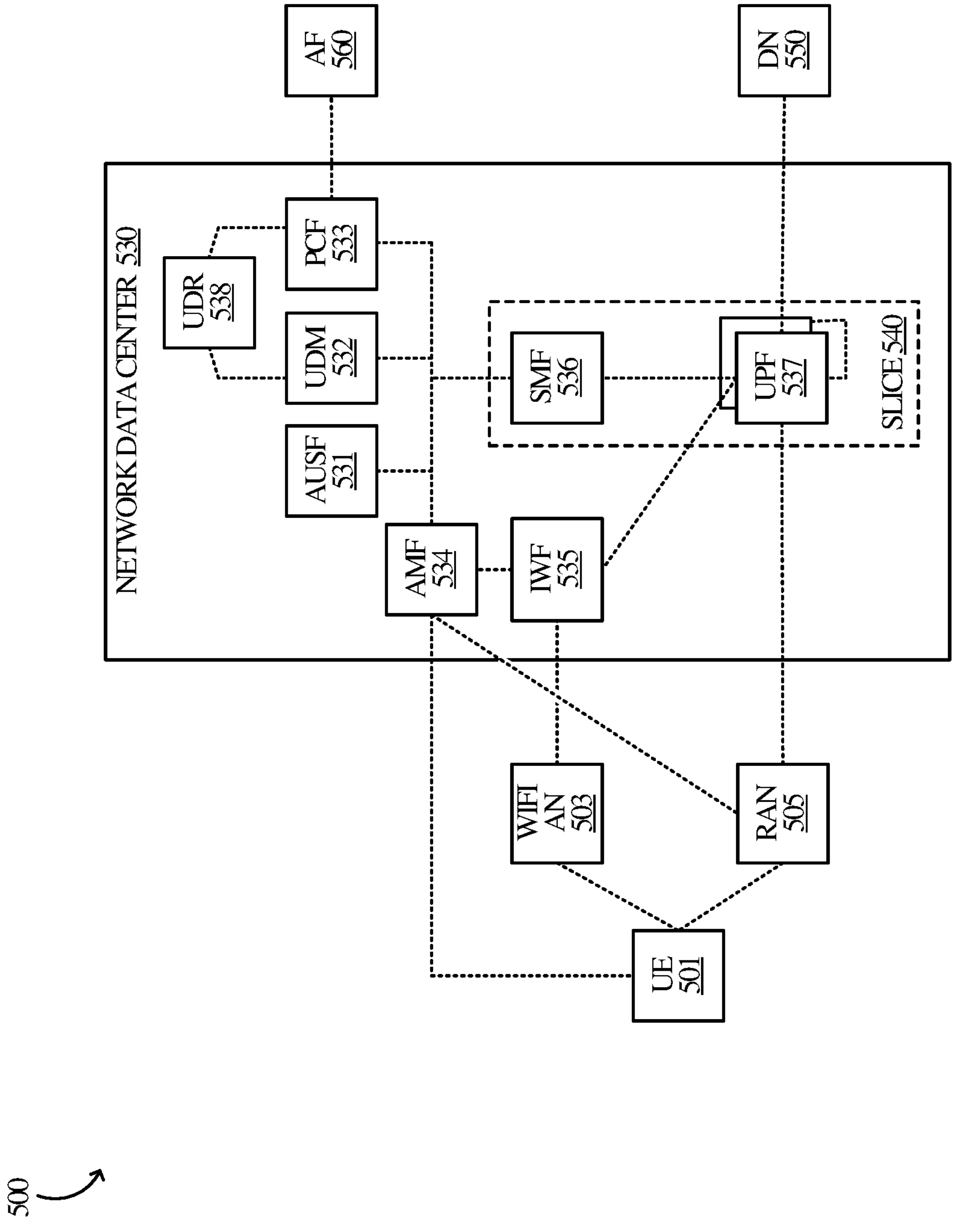
FIG. 5 illustrates a wireless network architecture for wireless communication with a UE in an implementation.
Figure 6:
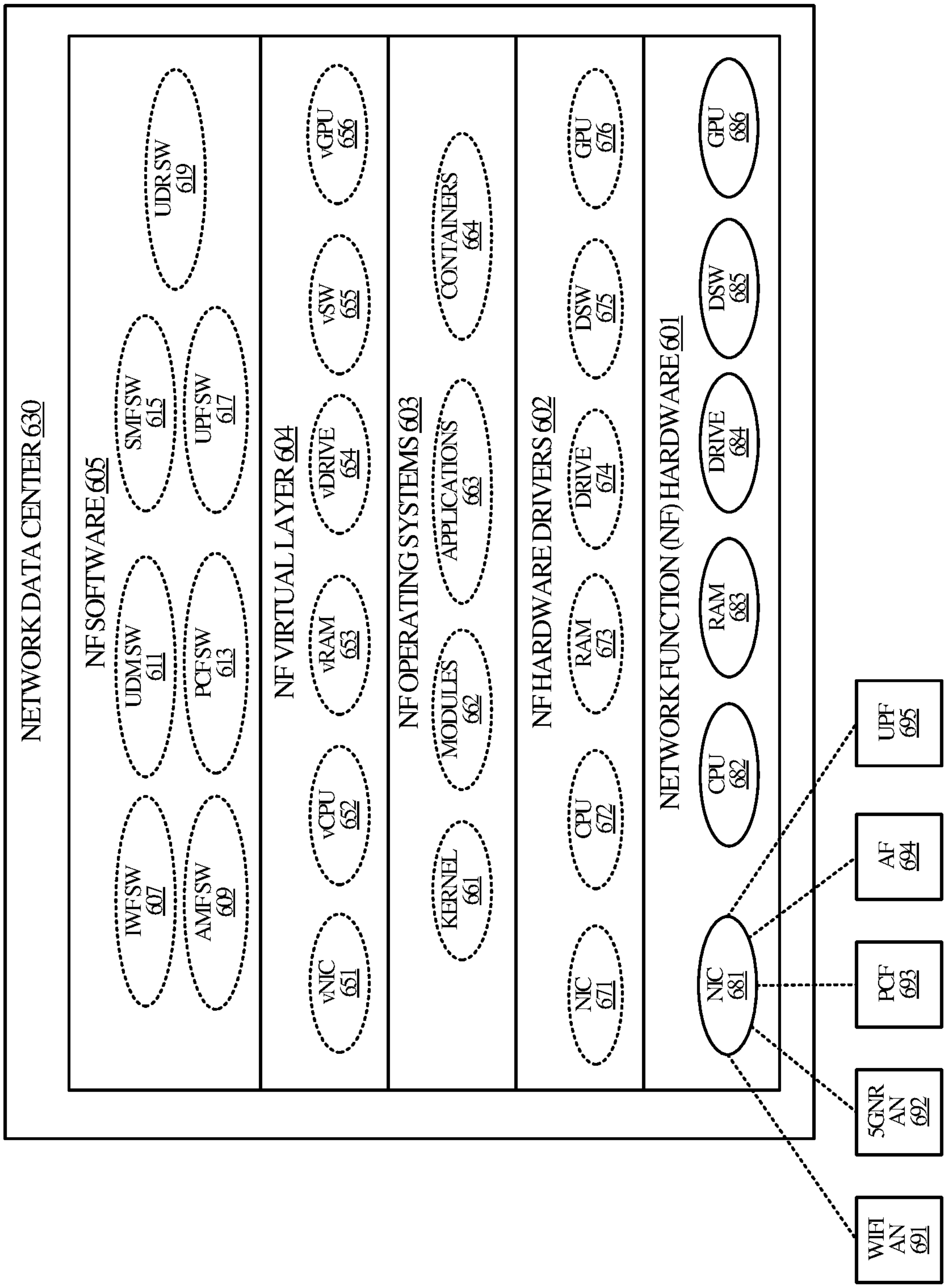
FIG. 6 illustrates a network data center of a wireless network in an implementation.
Figure 7:
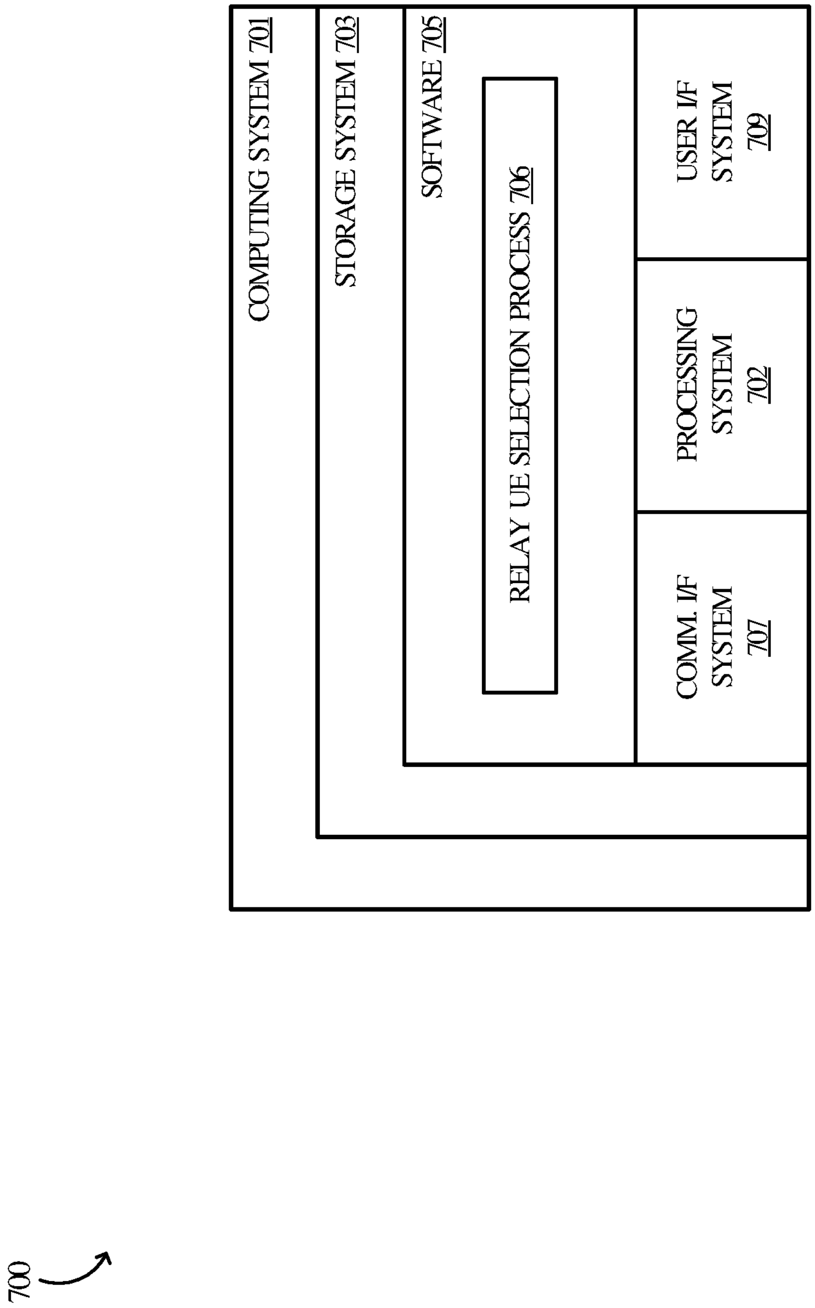
FIG. 7 illustrates a computing system suitable for implementing the various operational environments, architectures, processes, scenarios, and sequences discussed below with respect to the other Figures.

Wireless network 120 is representative of a network capable of using a Fifth Generation New Radio (5GNR), LTE, or 6G protocol to communicate with remote UE 110 and relay UEs 141, 143, and 145 via a RAN, such as RAN 131. In an implementation, wireless network 120 is representative of a service-based architecture (SBA), of which network architecture 500 of FIG. 5 is representative, which includes network functions which constitute the control plane and user plane of a wireless communication network core, of which network data center 630 of FIG. 6 is representative. The network functions of wireless network 120 are implemented on one or more suitable computing devices, of which computing device 701 of FIG. 7 is representative. Examples of suitable computing devices include server computers, blade servers, and the like. The network elements of wireless network 120 may be implemented in the context of one or more data centers in a co-located or distributed manner, or in some other arrangement.

Sidelink connection 111 is representative of direct or single-hop device-to-device communication according to a wireless radio frequency protocol in an implementation. The wireless radio frequency protocols for sidelink connection 111 include, but are not limited to, 5GNR, LTE, Wifi, Bluetooth, IEEE 802.11p, C-V2X (e.g., PC5, LTE-V2X, or 5G-V2X), Dedicated Short Range Communication (DSRC), 3GPP LTE Proximity Services (ProSe), or Near Field Communication (NFC) protocols. Sidelink communication between two wireless devices allows the devices to communicate as peers. Sidelink connections also allow one device to relay communication between a network access point and a second, remote device. For example, a wireless device in communication with a network access point via the Uu interface may relay communication from the network to the second, remote device via a PC5 interface. As illustrated in operational scenario 100, relay UE 143 relays communication between RAN 131 and remote UE 110 via sidelink connection 111.

Direct connection 112 is representative of a wireless connection between a wireless device and an access point of wireless network according to a wireless radio frequency protocol, such as Fifth Generation New Radio (5GNR), 5G Advanced, 6G, LTE, Institute of Electrical and Electronic Engineers (IEEE) 802.11 (Wifi), Low-Power Wide Area Network (LP-WAN), Near-Field Communications (NFC), Code Division Multiple Access (CDMA), Frequency Division Multiple Access (FDMA), and Time Division Multiple Access (TDMA), in an implementation. Direct connection 112 may be carried on the Uu interface between RAN 131 and relay UE 143. As illustrated in operational scenario 100, relay UE 143 receives communication from RAN 131 and remote UE 1110 via direct connection 112, including communication to be relayed to remote UE 110 via sidelink connection 111.

In operation, remote UE 110 determines that it is out of range of a signal from an access point of wireless network 120 or that the measured strength of a signal received from AN 131 is below a threshold value. Remote UE 110 performs a relay discovery by broadcasting a solicitation message to discover candidate devices for relaying communication to an access point of wireless network 120. The solicitation message includes the connectivity service that remote UE 110 is looking for. The discovery message is received by relay UEs 141, 143, and 145 which return a response message. Alternatively, relay UEs 141, 143, and 145 periodically broadcast a discovery message, including the connectivity services they can provide, which remote UE 110 actively listens for. In either case, remote UE 110 assesses the signal power (e.g., SL-RSRP or SD-RSRP) for each of the candidate devices based on the messages received by remote UE 110. Those devices with sufficient signal strength (e.g., above a threshold value) and with Uu interface signal value within an acceptable range of values form a pool of candidate devices for a sidelink connection with remote UE 110. For the sake of illustration, it will be assumed that each of relay UEs 141, 143, and 145 meet baseline requirements for received signal strength and Uu interface strength to be among the pool of candidate devices for a sidelink connection with remote UE 110.

Having established a set of candidate devices for a sidelink connection meeting baseline requirement, remote UE 110 assesses each candidate device according to one or more selection factors. The selection factors include metrics such as throughput, frequency, bandwidth, RSRQ, and power, and metrics relating to the carrier bandwidth or frequency band of the connection between each relay device and a serving cell, such as duplexing mode, uplink budget, and penetration. Other factors may include a projected battery consumption of remote UE 110 in communicating via a sidelink connection to the device. Still other factors may include historical data gathered from previous sidelink connections with the candidate device, such as SNR, location, MIMO configuration, modulation-and-coding scheme (MCS), or other transmission characteristics or environmental factors. In addition, while the candidate devices may all be connected to the same access point (for example, when all the candidate devices are in a proximity of the access point), it is within the scope of this disclosure for the remote UE to consider and select from relay devices connected to different access points.

For example, three candidate relay UEs may communicate with AN 131 via mid-band n41 frequency bandwidth with time-division duplexing (TDD), low-band n71 with frequency-division duplexing (FDD), or mid-band n26 with FDD. Each band may have a different carrier bandwidth: the n41 band may have a 100 MHz bandwidth, the n71 band may have a 10 MHz bandwidth, and the n26 band may have a 20 MHz bandwidth. Because the remote UE must rely on the relay device's connection to the serving cell in connecting to the network via a sidelink, the remote UE will assess various metrics of that connection in selecting a relay device. The remote UE may determine that the candidate relay device operating at a mid-band frequency with time-division duplexing (e.g., n41) has less desirable characteristics, such as the weakest uplink budget and weakest penetration of the three devices and is subject to a greater degree of fluctuation, while the candidate relay device operating at mid-band frequency with FDD (e.g., n26) has greater throughput than the candidate device operating at the n71 carrier bandwidth. On that basis, the remote UE may select the candidate device operating at the n26 bandwidth.

To make the selection based on various selection factors, remote UE 110 may operate a selection engine which receives the various selection factors and outputs the optimal selection or best choice from among the candidate relay devices. The optimal selection may be the identification of a single candidate relay device or an ordered list of relay devices from which remote UE 110 selects the highest-ranking relay UE. The selection engine may employ an algorithm which receives and weights the values of the selection factors for each device to compute an output score for each device by which to select the optimal relay device. In other scenarios, the selection engine may be an artificial intelligence or machine learning model trained to generate a score for each candidate device based on the respective values of the selection factors. For example, the selection engine may be an artificial neural network trained based on historical connection data including selection factors and ground-truth values by which the sidelink connection is to be evaluated. The trained neural network, at run-time, receives a feature vector (e.g., a one-dimensional data structure) for each candidate relay device and outputs a connection score for the devices by which remote UE 110 can select the optimal relay UE.

Figure 2:
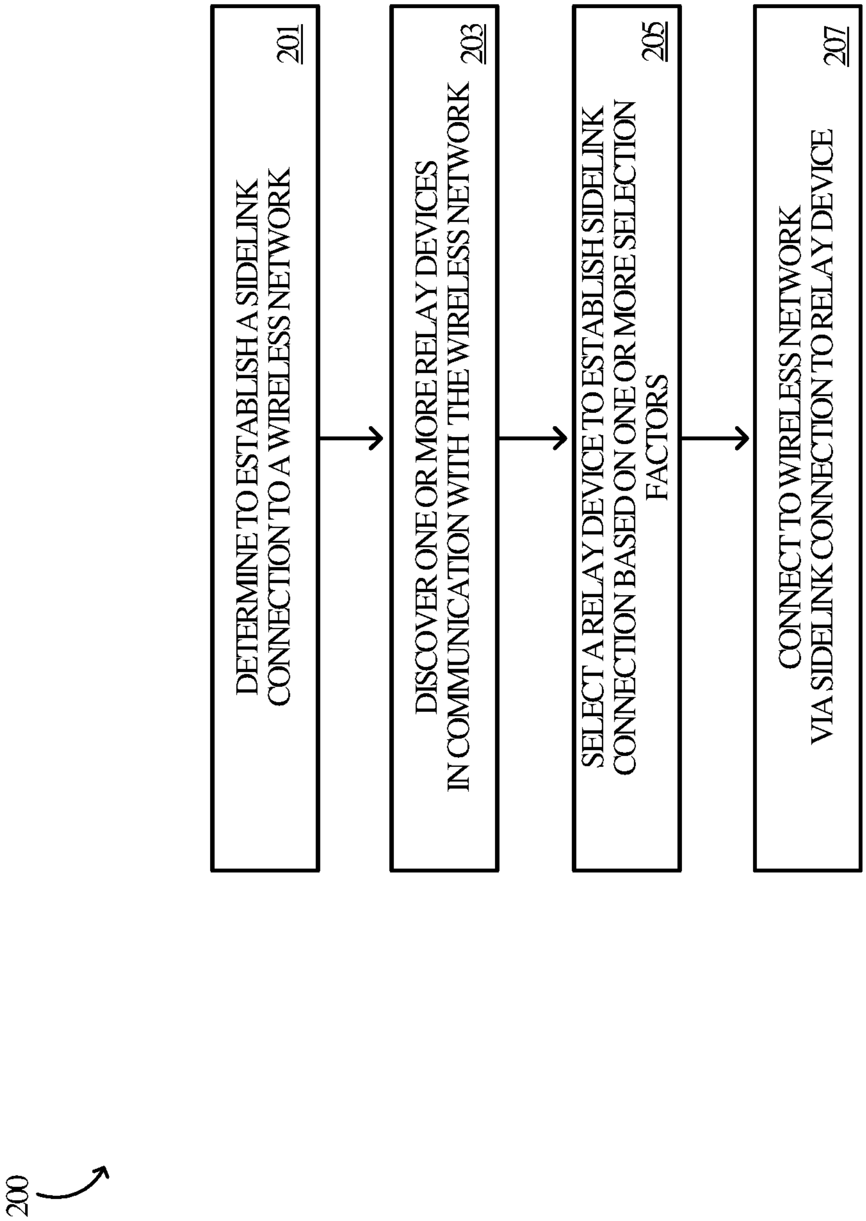
FIG. 2 illustrates a process for selecting a relay UE for sidelink communication in an implementation.

FIG. 2 illustrates process 200 for selecting a relay UE for a sidelink connection in an implementation. Process 200 may be implemented on one or more computing devices, such as server computers or computers in the context of a network data center, according to program instructions which direct the computing devices to function as follows, referring parenthetically to the steps in FIG. 2 and in the singular for the sake of clarity.

In process 200, a wireless device determines to establish a sidelink connection to a wireless network (step 201). The wireless device may, for example, may fail to detect a carrier signal from an access point (e.g., because it is outside the coverage area of the access point), or the device may determine that the carrier signal from the access point is too weak (e.g., below a threshold value) for a stable connection. In other scenarios, the wireless device may detect a signal of sufficient power for a direct connection to the access point but elect to survey and evaluate candidate relay devices for switching to a sidelink connection to the access point.

The wireless device discovers one or more relay devices in connection with the wireless network (step 203). In an implementation, the wireless device exchanges discovery messages with one or more candidate relay devices. For example, the wireless device may transmit a solicitation message and receive one or more response messages from candidate relay devices. Alternatively, the candidate relay devices may transmit discovery messages which are received by the wireless device. In various implementations, after the wireless receives messages from the relay devices, the wireless device identifies those relay devices which fulfill a baseline set of requirements for a sidelink connection to the access point. The baseline set of requirements include, in an implementation, a received signal power determined from the message sent by the candidate device and a Uu interface signal power transmitted by each of the candidate devices in the discovery message.

Having discovered one or more relay devices to which a sidelink connection can be established, the wireless device selects a relay device to establish the sidelink connection based on one or more selection factors (step 205). In an implementation, the wireless device receives information from each of the relay devices which includes the metrics relating the device's connection to the access point and to the type of service which the relay device can provide for the sidelink. For example, the selection factors may include a throughput of the relay device computed by the wireless device based on the Shannon equation which computes a throughput based on bandwidth, MIMO layers, and SNR. Other selection factors can include the frequency bandwidth, output power, receive signal power and/or quality, MCS, and the like. The wireless device selects a relay device from among the one or more candidate devices based on the selection factors.

To select a relay device from among multiple candidate devices, the wireless device may use a selection engine. For example, the selection engine may receive a set of input values for each of the candidate relay devices and compute a connection score for each device based on an algorithm which predicts the quality of the sidelink connection (e.g., a Quality of Service or QoS metric) or a likelihood of successful sidelink connection or other selected metric. In other implementations, the selection engine may include a trained AI model which receives an input vector including normalized values of the selection factors and which generates an output score for the sidelink connection which estimates the quality of the connection, a probability of a successful connection, or other metric by which to compare the candidate devices. With a score generated for each of the candidate devices, the wireless device selects the device with the score that reflects the best or most optimal sidelink connection.

Having selected a relay device based on the selection factors, the wireless device establishes a connection to the wireless network via the sidelink connection to the relay device (step 207). In an implementation, the wireless device establishes a sidelink connection to the selected relay device via a PC5 interface. The relay device then relays communication between the wireless device and the wireless network.

In various implementations, the wireless device continues to discover and evaluate candidate relay devices for switching to a new sidelink connection with another relay device. The wireless device may also continue to evaluate whether to switch to a direct connection to the access point.

Referring again to FIG. 1, operational environment 100 illustrates a brief example of process 200 as employed by elements of operational environment 100. In operation, remote UE 110, outside coverage area 132 of RAN 131, determines to establish a sidelink connection to be able to communicate with wireless network 120. UE 110 discovers relay UEs 141, 143, and 145, each of which meets a baseline set of requirements for establishing a sidelink connection. The baseline set of requirements include a minimum received signal strength as determined by a discovery message received by remote UE 110 and an appropriate Uu interface signal power level for communication with RAN 131, where the signal power level is within a range of acceptable values.

Having determined that relay UEs 141, 143, and 145 are candidates for establishing a sidelink connection, remote UE 110 selects a relay UE based on one or more selection factors. The selection factors may include a throughput or capacity of connecting to wireless network 120 via a respective relay device. Other factors may include factors such as the frequency bandwidth, SNR (as detected or based on historical data), RSRP, RSRQ, MCS, output power of the respective candidate device, and the like. The selection factors may be weighted according to the type or network slice of service which remote UE 110 seeks to establish in connecting to wireless network 120. For example, if remote UE 110 is a smartphone seeking to make a voice call, the selection factors may be weighted differently than if remote UE 110 is seeking access to wireless network 120 to livestream a video.

Remote UE 110 configures the set of values (e.g., as a data vector of values) for the selection factors and inputs the values into a selection engine. The selection engine evaluates the set of values for each of the candidate devices to produce a selection of one of relay UEs 141, 143, and 145. The output may identify the selected device based on a score derived from the respective set of input values or the output may rank the devices according to suitability for hosting a sidelink connection. For the sake of illustration, it will be assumed that relay UE 143 was selected for the sidelink connection based on a comparison of scores. With relay UE 143 selected, remote UE 110 establishes the sidelink connection with relay UE 143 which in turn relays communication between remote UE 110 and RAN 131, enabling remote UE 110 to access wireless network 120.

Figure 3:
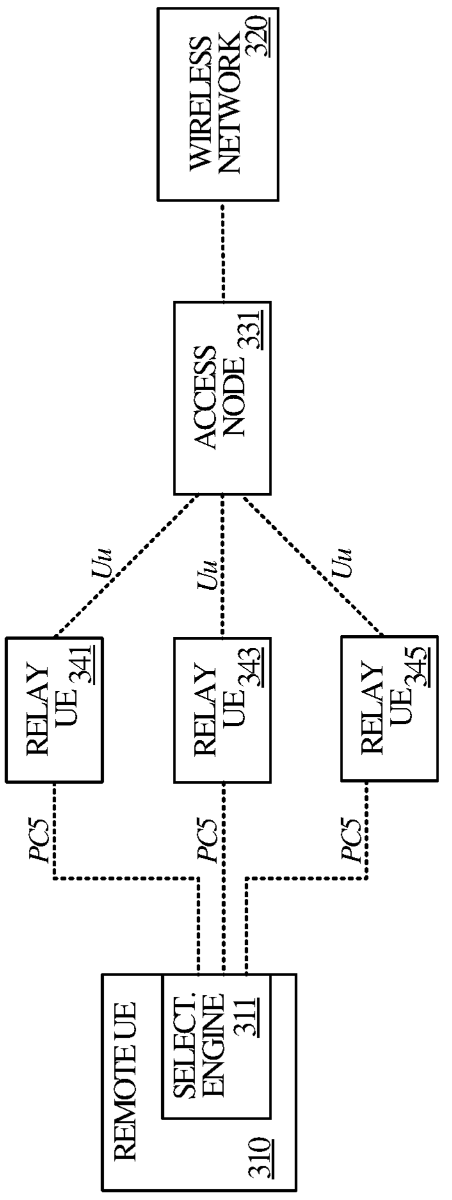
FIG. 3 illustrates an operational scenario for selecting a relay UE for sidelink communication in an implementation.

Turning now to FIG. 3, FIG. 3 illustrates operational scenario 300 in which a remote UE selects a relay UE for a sidelink connection in an implementation. Operational scenario 300 includes remote UE 310, a wireless device including selection engine 311. Relay UEs 341, 343, and 345 are wireless devices in communication with RAN 331 of wireless network 320.

Remote UE 310 and relay UEs 341, 343, and 345 are representative of wireless devices for communication with other wireless devices or access points of a wireless network via a wireless protocol such as 5GNR, LTE, Wifi, or other wireless communication protocol.

RAN 331 is representative of equipment using radio frequencies to provide wireless connectivity to devices, such as Fifth Generation (5G) RANs, long-term evolution (LTE) RANS, gNodeBs, eNodeBs, or other types of access nodes, of a wireless communication network. Wireless network 320 is representative of a network capable of using a 5GNR, LTE, or 6G protocol to communicate with remote UE 310 and relay UEs 341, 343, and 345 via RAN 331.

Figure 4:
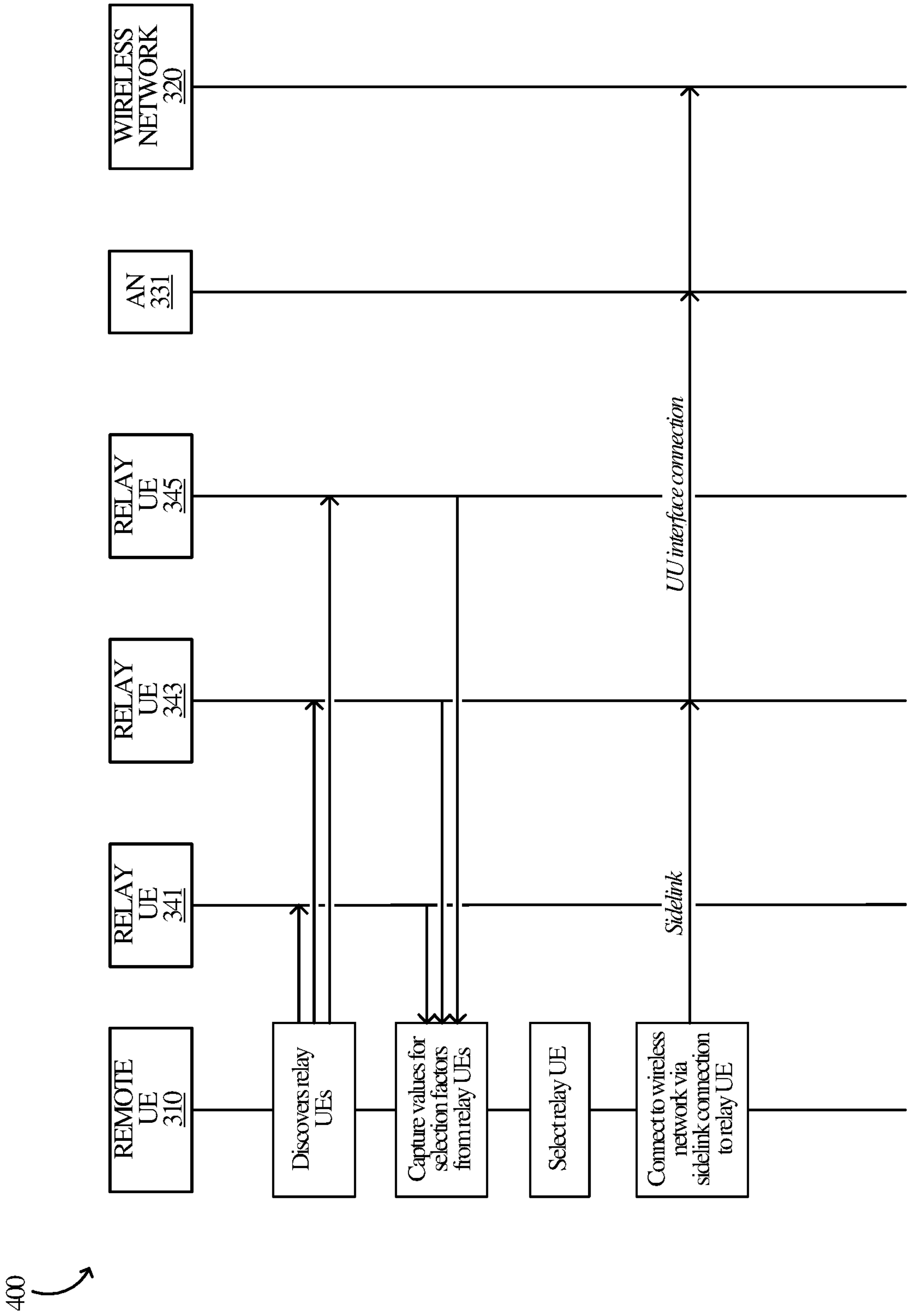
FIG. 4 illustrates a process for selecting a relay UE for sidelink communication in an implementation.

FIG. 4 illustrates in process 400 a brief operational example of selecting relay UE by a remote UE in an implementation, referring to elements of operational scenario 300. In process 400, remote UE 310 discovers relay UEs 341, 343, and 345 and communicates with relay UEs 341, 343, and 345, such as exchanging discovery messages, via a PC5 interface between the devices. Remote UE 310 receives a discovery message from each of relay UEs 341, 343, and 345 and determines which if any of the relay UEs are candidates for a sidelink connection to wireless network 320. To determine whether the relay UEs can host a sidelink connection for remote UE 310, remote UE 310 evaluates each relay UE based on the received signal power of each relay device (according to the discovery message received from the device) and the signal strength of each device at its Uu interface with RAN 343.

Assuming for the sake of illustration that remote UE 310 has established that each of relay UEs 341, 343, and 345 meets a baseline set of requirements for hosting a sidelink connection, remote UE 310 captures data for selecting a relay device from among the candidate devices. The data captured for selection includes metrics associated with the connection of each device to RAN 331, such as throughput, bandwidth, and the like. To capture the data, remote UE 310 may receive metrics in the discovery message which include the type and quality of service each device can provide. In some scenarios, remote UE 310 may ping a candidate device to provide the desired data. If remote UE 310 fails to capture at least some of the desired data for a candidate device, remote UE 310 may remove that device from consideration.

Having captured connection data for each of the candidate devices, remote UE 310 configures the data for evaluation by selection engine 311. In some implementations, the data is evaluated according to an algorithm which forms a composite score based on the captured data. In other implementations, the data is evaluated by a trained neural network model which receives an input vector based on the captured data and generates the composite score according to its training. With a composite score generated for each of the candidate devices, remote UE 310 selects a relay device to host the sidelink connection. For the sake of illustration, it is assumed that relay UE 343 has the highest composite score of the three devices indicating that it is the best or optimal choice for hosting the sidelink connection.

With a relay device selected, remote UE 310 establishes a sidelink connection with relay UE 343. Remote UE 310 then communicates with wireless network 320 via the wireless connection relayed by relay UE 343 to RAN 331, then to wireless network 320.

FIG. 5 illustrates wireless network architecture 500 that serves wireless User Equipment (UE) 501 in an implementation. Wireless network architecture 500 includes UE 501, Wifi Access Node (AN) 503, 5GNR RAN 505, Interworking Function (IWF) 535, Access and Mobility Management Function (AMF) 534, Authentication Server Function (AUSF) 531, Unified Data Management (UDM) 532, Policy Control Function (PCF) 533, Unified Data Repository (UDR) 538, Session Management Function (SMF) 536, User Plane Function (UPF) 537, and Application Function (AF) 560. UDR 538 is representative of computing devices with capabilities for network data storage, of which computing device 701 of FIG. 7 is representative. AF 560 may provide policies applicable to control plane functions, that is, to the application, presentation, and/or session layers of the OSI protocol stack. IWF 535 includes non-3GPP IWFs (N3IWFs) for providing untrusted non-3GPP access to network data center 530, such as access via a non-cellular access network. Wireless network slice 540 includes UPF 537 and SMF 536. DN 550 is representative of a data network, Internet access, third-party resource, or other endpoint of an end-to-end communication path from UE 501.

FIG. 6 illustrates exemplary network data center 630 of a wireless communication system, such as wireless network 120 of FIG. 1, in an implementation. Network data center 630 includes network function (NF) software 605, network function virtual layer 604, network function operating systems 603, network function hardware drivers 602, and network function hardware 601.

Network function software 605 of network data center 630 includes software for executing various network functions: IWF software 607, AMF software 609, UDM software 611, PCF software 613, SMF software 615, and UPF software 617. Other network function software, such as network repository function (NRF) software, are typically present but are omitted for clarity.

Network function virtual layer 604 includes virtualized components of network data center 630, such as virtual NIC 651, virtual CPU 652, virtual RAM 653, virtual drive 654, virtual software 655, and virtual GPU 656. Network operating systems 603 includes components for operating network data center 630 including kernels 661, modules 662, applications 663, and containers 664 for network function software execution. Network function hardware drivers 602 include software for operating network function hardware 601 of network data center 630, including network interface card (NIC) drivers 671 for network interface cards (NICs) 681, CPU drivers 672 for CPUs 682, RAM drivers 673 for RAM 683, flash/disk drive drivers 674 for flash/disk drives 684, data switch (DSW) drivers 675 for data switches 685, and drivers 676 for GPUs 686. Network interface cards 681 of network function hardware 601 include hardware components for communicating with Wifi access node 691, 5GNR access node 692, PCF 693, application server 694, and UPF 695.

FIG. 7 illustrates computing device 701 that is representative of any system or collection of systems in which the various processes, programs, services, and scenarios disclosed herein may be implemented. Examples of computing device 701 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements relay UE selection process 706, which is (are) representative of the relay UE selection processes discussed with respect to the preceding Figures, such as process 200 and process 400. When executed by processing system 702, software 705 directs processing system 702 to operate as described herein for at least the various processes, operational scenarios, and sequences discussed in the foregoing implementations. Computing device 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including relay UE selection process 706) may be implemented in program instructions and among other functions may, when executed by processing system 702, direct processing system 702 to operate as described with respect to the various operational scenarios, sequences, and processes illustrated herein. For example, software 705 may include program instructions for implementing a process for selecting a relay UE for a sidelink connection as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing device 701 is representative) overall from a general-purpose computing system into a special-purpose computing system customized to support selecting a relay UE for a sidelink connection in an optimized manner. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of operating a wireless communication device, the method comprising:

determining, by the wireless communication device, to establish a sidelink connection to a wireless communication network;

discovering, by the wireless communication device, one or more relay devices in communication with the wireless communication network, wherein the wireless communication device comprises a neural network trained to evaluate the one or more relay devices based on one or more selection factors;

selecting, by the wireless communication device, a relay device of the one or more relay devices to establish a sidelink connection to the wireless communication network based on a score generated by the neural network by evaluating the one or more selection factors, wherein the one or more selection factors comprise a throughput of the relay device; and connecting, by the wireless communication device, to the wireless communication network via the sidelink connection to the relay device.

2. The method of claim 1, wherein determining to establish the sidelink connection is in response to determining, by the wireless communication device, that it is outside of a coverage area of the wireless communication network.

3. The method of claim 1, further comprising selecting the one or more relay devices based on a received signal power of the one or more relay devices.

4. The method of claim 3, further comprising selecting the one or more relay devices based on a signal strength of the one or more relay devices at an interface with an access point of the wireless communication network.

5. The method of claim 4, wherein the selection factors further comprise one or more of a frequency band and a bandwidth associated with the relay device.

6. The method of claim 5, wherein the selection factors further comprise one or more of signal quality, multiple input-multiple output (MIMO) configuration, and modulation encoding scheme associated with the relay device.

7. The method of claim 3, wherein the selection factors further comprise an availability of a direct connection to an access node of the wireless communication network.

8. The method of claim 6, wherein the selection factors further comprise historical connection data associated with the relay device.

9. The method of claim 1 further comprising:

inputting, by the wireless communication device, one or more feature vectors that represent the one or more selection factors into the neural network; and obtaining, by the wireless communication device, an output from the neural network that comprises the score; and wherein the neural network processes the one or more feature vectors that represent the one or more selection factors to generate the score.

10. A computing apparatus comprising:

one or more computer readable storage media;

one or more processors operatively coupled with the one or more computer readable storage media; and program instructions stored on the one or more computer readable storage media that, when executed by the one or more processors, direct the computing apparatus to at least:

determine to establish a sidelink connection to a wireless communication network, wherein the computing apparatus comprises a remote User Equipment (UE);

discover one or more relay devices in communication with the wireless communication network, wherein the computing apparatus comprises a neural network trained to evaluate the one or more relay devices based on one or more selection factors;

select a relay device of the one or more relay devices to establish a sidelink connection to the wireless communication network based on a score generated by the neural network by evaluating the one or more selection factors, wherein the one or more selection factors comprise a throughput of the relay device; and connect to the wireless communication network via the sidelink connection to the relay device.

11. The computing apparatus of claim 10, wherein the program instructions direct the computing apparatus to determine to establish the sidelink connection in response to the computing apparatus determining that it is outside of a coverage area of the wireless communication network.

12. The computing apparatus of claim 10, wherein the program instructions further direct the computing apparatus to select the one or more relay devices based on a received signal power of the one or more relay devices.

13. The computing apparatus of claim 12, wherein the program instructions further direct the computing apparatus to select the one or more relay devices based on a signal strength of the one or more relay devices at an interface with an access point of the wireless communication network.

14. The computing apparatus of claim 13, wherein the selection factors further comprise one or more of a frequency band and a bandwidth associated with the relay device.

15. The computing apparatus of claim 14, wherein the selection factors further comprise one or more of signal quality, multiple input-multiple output (MIMO) configuration, and modulation encoding scheme associated with the relay device.

16. The computing apparatus of claim 15, wherein the selection factors further comprise an availability of a direct connection to an access node of the wireless communication network.

17. One or more computer-readable storage media having program instructions stored thereon that, when executed by one or more processors of a computing device, direct the computing device to at least:

determine to establish a sidelink connection to a wireless communication network, wherein the computing device comprises a remote User Equipment (UE);

discover one or more relay devices in communication with the wireless communication network, wherein the computing device comprises a neural network trained to evaluate the one or more relay devices based on one or more selection factors;

select a relay device of the one or more relay devices to establish a sidelink connection to the wireless communication network based on a score generated by the neural network by evaluating the one or more selection factors, wherein the one or more selection factors comprise a throughput of the relay device; and connect to the wireless communication network via the sidelink connection to the relay device.

18. The one or more computer-readable storage media of claim 17, wherein the program instructions direct the computing device to determine to establish the sidelink connection in response to the computing device determining that it is outside of a coverage area of the wireless communication network.

19. The one or more computer-readable storage media of claim 17, wherein the program instructions further direct the computing device to select the one or more relay devices based on a received signal power of the one or more relay devices.

20. The one or more computer-readable storage media of claim 19, wherein the program instructions further direct the computing device to select the one or more relay devices based on a signal strength of the one or more relay devices at an interface with an access point of the wireless communication network.

* * * * *